June 29, 1937.  M. STANSBURY  2,085,173
APPARATUS FOR LIQUID DISTRIBUTION FOR HYDRAULIC BRAKES
Filed Nov. 2, 1932
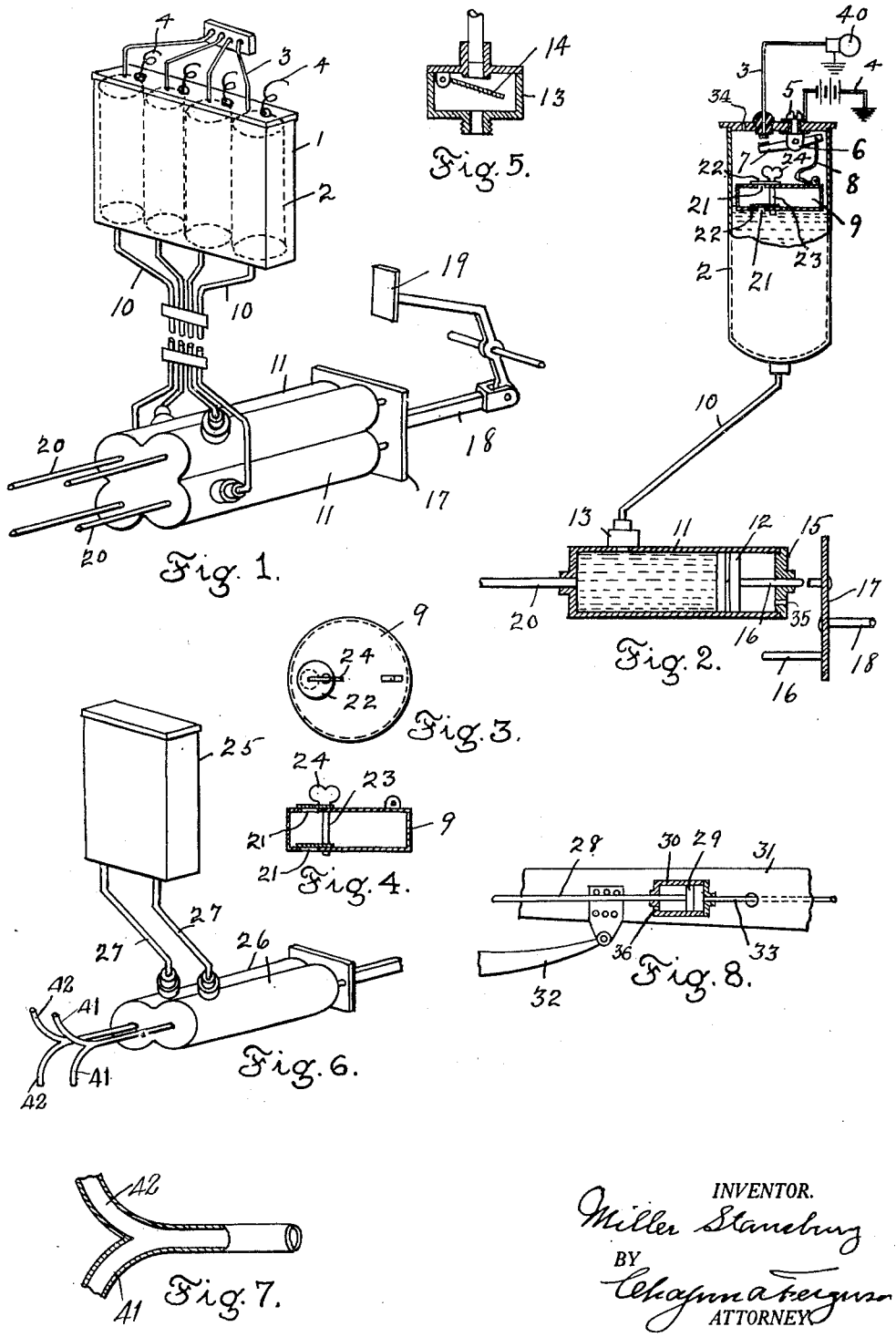
INVENTOR.
Miller Stansbury
BY
Chapman Ferguson
ATTORNEY

UNITED STATES PATENT OFFICE 2,085,173

APPARATUS FOR LIQUID DISTRIBUTION FOR HYDRAULIC BRAKES

Miller Stansbury, Washington, D. C.

Application November 2, 1932, Serial No. 640,889

1 Claim. (Cl. 188—152)

This invention relates to improvements in hydraulic brakes for motor vehicles, and has for its object to automatically maintain the proper amount of liquid in the braking system, as well as to provide for the escape of air that may enter said system.

The invention consists of the novel construction and arrangement of the parts and combination of parts hereinafter more fully set forth in the following specification and pointed out in detail in the appended claim.

In the accompanying drawing,—

Figure 1 is a perspective view of the liquid distributing system as applied to a large car.

Figure 2 is a vertical longitudinal section of one of the reserve tanks and one of the distributing cylinders.

Figure 3 is an enlarged plan view of one of the reserve tank floats.

Figure 4 is a vertical longitudinal section of Figure 3.

Figure 5 is an enlarged detail vertical section of one of the check-valves used on the distributing cylinders.

Figure 6 is a modification in which two reserve tanks and two distributing cylinders are employed.

Figure 7 is an enlarged detail section of one of the V-unions used in the modification shown in Figure 6.

Figure 8 is a further modification of my invention.

Referring to the accompanying drawing, forming part of this specification, and in which like reference numerals designate like parts throughout the several views, I designates a sheet metal case to be secured to the dash-board under the hood of the car and holding four reserve tanks 2. Each of the tanks 2 are connected by a wire 3 which leads to a corresponding light 40 mounted on the instrument panel in the driving compartment of the car, and 4 designates hot wires leading from said tanks to the battery. These wires 4 have one end secured under the screw 5 which passes through the cover of the reserve tank 2 and holds the bearing 6 in position. The said bearing 6 is insulated from the cover. The arm 7 is pivoted in the bearing 6 and has a cord, or chain, 8 connected to one end. The said cord 8 is connected at its opposite end to the float 9 so that when the oil in the reserve tank 2 is lowered to a predetermined point, by leakage in the system, the arm 7 will rock on its pivot and cause the free end thereof to contact with the wire 3 and close the circuit to the light 40 in circuit with that particular tank, thus indicating to the driver in which tank the leakage has occurred. A copper tube 10 connects each of the reserve tanks 2 with one of the distributing cylinders 11, which latter are mounted on the frame of the car. The cylinders 11 are cast en bloc, the inner walls being machined out to give a close fit for the pistons 12 therein. A check valve 13 is mounted on each of the cylinders 11 and each connect with one of the tubes 10 leading from the reserve tanks 2. The said check-valves 13 are normally open with their valves 14 in the position shown in Figure 5 of the drawing so that any air that may get into the system will work its way back and pass up through the valve 13, through the tube 10 and cylinder 2 past the float 9 and out through the air-vent 34 in the cover of the reserve tank 2. The inner end of the cylinders 11 is covered by a plate 15 which is provided with an air vent 35, the said plate being easily removable should repair of parts become necessary. Each of the piston rods 16 is fastened to a pressure plate 17 so that all the pistons 16 will operate in unison. Said plate 17 is connected by means of the linkage 18 to the brake pedal 19. Each of the cylinders 11 is provided with a copper tube 20 running to one of the expansion chambers (not shown) in each wheel of the car. The float 9 in each of the reserve tanks 2 is hollow and is provided with a hole 21 in the top and bottom surfaces, covered by the plates 22 on the rod 23 which latter is mounted in the top and bottom of said float and has a winged head 24 on its upper end by means of which the rod can be turned to uncover the holes 21 to permit air to pass therethrough so that the float 9 can be raised should the tank need refilling, also to permit liquid to be put in the float 9 in case added pressure on the surface of the column of liquid is desired. The type of float structure shown with its manually operated ports offers the operator a means for adjusting the operation of the indicating means for by partially filling the float through the said ports the float will ride lower in the liquid and this practice may include the use of that amount, however small, stored within the float as an additional reserve which may of course be released into the braking system at will. When the system is in operation the holes 21 are closed, as shown in Figure 2 of the drawing. When the piston 12 moves forward the liquid will back up in the check valve 13 forcing the vane 14 upwardly and closing the valve so that no liquid can be forced through the tube 10, and when the piston is released any liquid lost will be automatically replaced by the liquid flowing from the reserve tank 2 to the cylinder 11. The tubes 10 are connected to the cylinders 11 near the front end thereof, so that should there be a leak in the system the piston 12 will only have to be released a short distance before uncovering the supply vent. Each of the pistons 12 is provided with a piston ring expanding against the wall of the cylinder and giving added protection against by-pass of the liquid from the front of the cylinder. The lights 40 connected to the wires 3 will warn the driver when the fluid in any of the separate systems is nearly all used.

In Figures 6 and 7 of the drawing I have shown a modification in which the system is reduced to two reserve tanks enclosed in the case 25, and two distributing cylinders 26 connected by tubes 27 to said reserve tanks. The two branch conduits 40 and 41 connect with the wheel brakes. The internal construction remains the same as that described in Figures 1 and 2 with the exception of the removal of the light circuit as an aid in reducing the cost of the production, however the lights may be adapted as described above if desired.

In Figure 8 I have shown a further modification in which all of the above mentioned systems may be adapted to a machine having a cam actuated brake shoe. A section of the frame 31 and of the spring 32 is shown merely to indicate the relative position of the frame where the chamber may be placed. In this system there will be a chamber for each linkage. Each of the expansion chambers 30 is provided with an air vent 36 and is connected by the tube 33 to one of the distributing cylinders heretofore described in either of the other mentioned systems. By this arrangement perfect equalization of mechanical brakes is assured at all times and will give more quiet operation as a large number of the drag links etc., which may squeak and rattle, will be eliminated.

Having thus described my invention, what I claim is:

In an hydraulic braking system for vehicles the combination of a plurality of integrally cast master compression chambers each provided with a piston slidable therein and means for actuating the said pistons in unison, a plurality of individual reserve tanks each provided with a float, a plurality of electrical indicating means one contained in each of the said reserve tanks and mechanically connected to the said float therein, suitable piping individually connecting the said reserve tanks to the said master compression chambers, a plurality of vane type check valves one in each of the said pipes connecting the said reserve tanks to the said compression chambers one of the said check valves located adjacent to and near the forward end of each of the said compression chambers.

MILLER STANSBURY.